(12) United States Patent
Hajjar

(10) Patent No.: US 6,421,483 B1
(45) Date of Patent: Jul. 16, 2002

(54) OPTICAL MONITORING IN OPTICAL INTERFEROMETRIC MODULATORS

(75) Inventor: Roger A. Hajjar, San Jose, CA (US)

(73) Assignee: Versatile Optical Networks, Inc., San Jose, CA (US)

( * ) Notice: Subject to any disclaimer, the term of this patent is extended or adjusted under 35 U.S.C. 154(b) by 0 days.

(21) Appl. No.: 09/797,783

(22) Filed: Mar. 1, 2001

Related U.S. Application Data

(60) Provisional application No. 60/260,581, filed on Jan. 9, 2001.

(51) Int. Cl.[7] .................................................. G02B 6/42
(52) U.S. Cl. ............................... 385/48; 385/2; 385/14
(58) Field of Search ........................... 385/2, 3, 14, 15, 385/48

(56) References Cited

U.S. PATENT DOCUMENTS

| 4,936,645 | A | * | 6/1990 | Yoon et al. ............... 350/96.14 |
| 6,181,456 | B1 | | 1/2001 | McBrien et al. |
| 6,298,178 | B1 | * | 10/2001 | Day et al. ..................... 385/14 |

* cited by examiner

Primary Examiner—Robert H. Kim
Assistant Examiner—Elizabeth Gemmell
(74) Attorney, Agent, or Firm—Fish & Richardson P.C.

(57) ABSTRACT

Techniques for optically sampling the output of a Mach-Zehnder electro-optic modulator without interfering with the output optical signal.

18 Claims, 3 Drawing Sheets

OPTICAL MONITORING IN OPTICAL INTERFEROMETRIC MODULATORS

This application claims the benefit of U.S. Provisional Application No. 60/260,581, filed Jan. 9, 2001.

TECHNICAL FIELD

This application relates to optical interferometric modulators for modulating light.

BACKGROUND

Mach-Zehnder electro-optic modulators modulate the intensity of light based on interference of two optical paths. At least one optical path is designed to have an electro-optic material so that a control voltage can be applied to modify the refractive index of the electro-optic material and hence the total optical path length. An input optical signal is split into two optical signals that are respectively coupled into the two optical paths. The two optical signals undergo different optical path lengths and hence are delayed relative to each other. The two optical signals are then combined and interfere with each other to generate an output optical signal.

The amount of the delay can be adjusted or modulated by the control voltage applied across the electro-optic material. Hence, when the relative delay between the two optical signals is 0, or $2\pi$, etc., the two signals constructively interfere to produce a maximum intensity output. However, when the relative delay is $\pi$, or $3\pi$, etc., the two signals destructively interfere to produce a minimum intensity output.

SUMMARY

The present disclosure includes techniques for optically monitoring the output optical signals of the above Mach-Zehnder modulators and more generally the output optical signals of optical interferometric modulators that use the optical interference between two optical paths to produce an intensity-modulated output optical signal. Such optical monitoring does not require optically tapping of the output optical signals of such modulators but uses another optical signal that is ordinarily unused in such optical modulators.

A device according to one embodiment includes an input waveguide, an output waveguide, and first and second waveguides formed on a substrate. The first and second waveguides respectively have receiving ends coupled to a port of the input waveguide and output ends coupled to a port of the output waveguide. An optical output coupling mechanism is provided to have one end coupled to the output waveguide and another end coupled to an output optical fiber which receives a guided output optical signal from the output waveguide. The device also includes an optical detector, displaced from the substrate and positioned near the optical output coupling mechanism, to receive an optical monitor signal that is not guided by either the output waveguide or the output optical fiber. In particular, this unguided optical monitor signal is complementary to the guided output signal.

An electro-optic material may be used in either or both of the first and the second waveguides to control the difference in the optical path length for the interference operation. The unguided optical monitor signal may be used to detect a drift in the optical path length difference between the first and second waveguides with respect to a desired value. A feedback control may be used to control the electro-optic material in response to the unguided optical monitor signal to reduce the drift. In addition, the unguided optical monitor signal may be used to monitor other aspects of the device, such the bit error rate in the guided output optical signal.

DESCRIPTION

Figure 1:
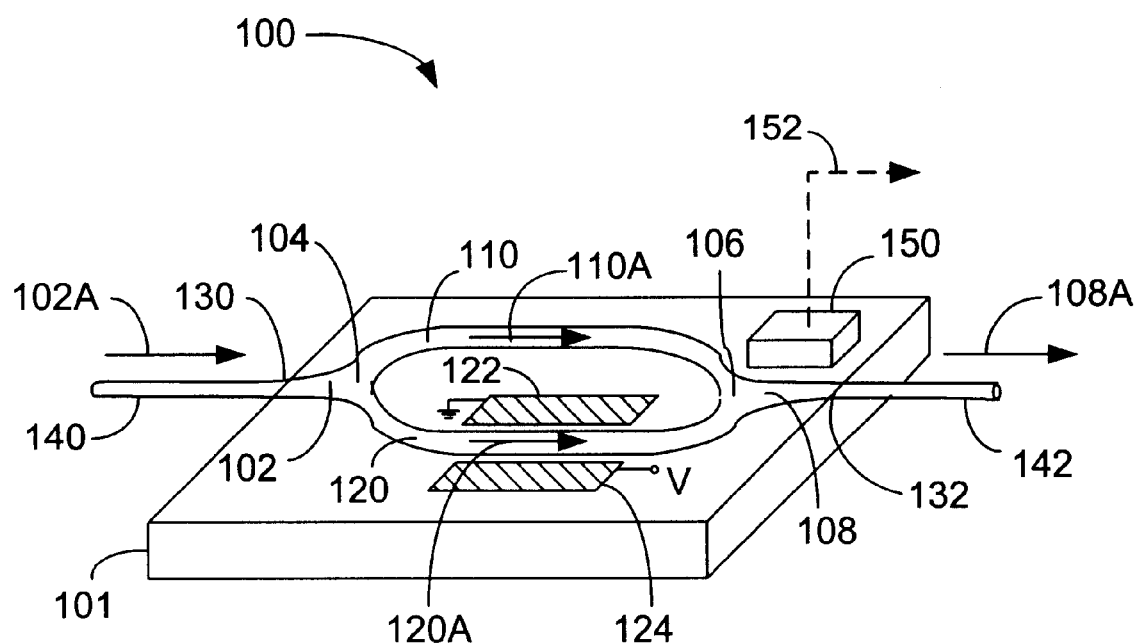
FIG. 1 illustrates a Mach-Zehnder electro-optic modulator with an optical sampling detector according to one embodiment.

FIG. 1 shows a Mach-Zehnder electro-optic modulator 100 as an example for a general optical interferometric modulator to illustrate the optical monitoring technique according to one embodiment. The modulator 100 is formed over a substrate 101. Optical dielectric waveguides 102, 110, 120, and 108 are fabricated on the substrate 101. The waveguide 102 is the input waveguide to receive an input optical signal 102A. The waveguide 108 is the output waveguide to output an output optical signal 108A. The waveguides 110 and 120 constitute two interference branches for the interference operation.

An optical waveguide coupler 104 is formed as an input port to couple receiving ends of the waveguides 110 and 120 to the output end of the input waveguide 102. The input signal 102A in the input waveguide 102 is thus split by the coupler 104 into a first signal 110A in the waveguide 110 and a second signal 120A in the waveguide 120. At least a portion of the waveguide 120 includes an electro-optic material whose refractive index changes in response to a control voltage. Electrodes 122 and 124 are fabricated on two sides of the waveguide 120 to supply this control voltage. The change in the refractive index of the electro-optical material changes the total optical path length (i.e., a sum of the products of the index and the physical length of all segments in the path) of the waveguide 120. This change can be used to control the difference in the optical path length of the two waveguides 110 and 120. Alternatively, both waveguides 110 and 120 may include electro-optic portions.

Another optical waveguide coupler 106 is also formed on the substrate 101 as an output port to join the output ends of the waveguides 110 and 120 to the receiving end of the output waveguide 108. Hence, the two optical signals 110A and 120A meet and interfere with each other at the coupler 106 to produce the output signal 108A. Notably, the output signal 108A is an optical signal guided by the output waveguide 108. It has a maximum amplitude when the difference in optical path lengths of signals 110A and 120A is equal to $K\lambda$ (i.e., a constructive interference) and a minimum amplitude when the difference is $(K+1/2)\lambda$ (i.e., a destructive interference), where $K=0, \pm 1, \pm 2, \ldots$ In terms of the amount of the relative delay between the two optical signals 110A and 120A, the maximum amplitude in the output 108A is produced when the delay is 0, or $2\pi$, etc., and the minimum amplitude in the output signal 108A is produced when the relative delay is $\pi$, or $3\pi$, etc.

Figure 4:
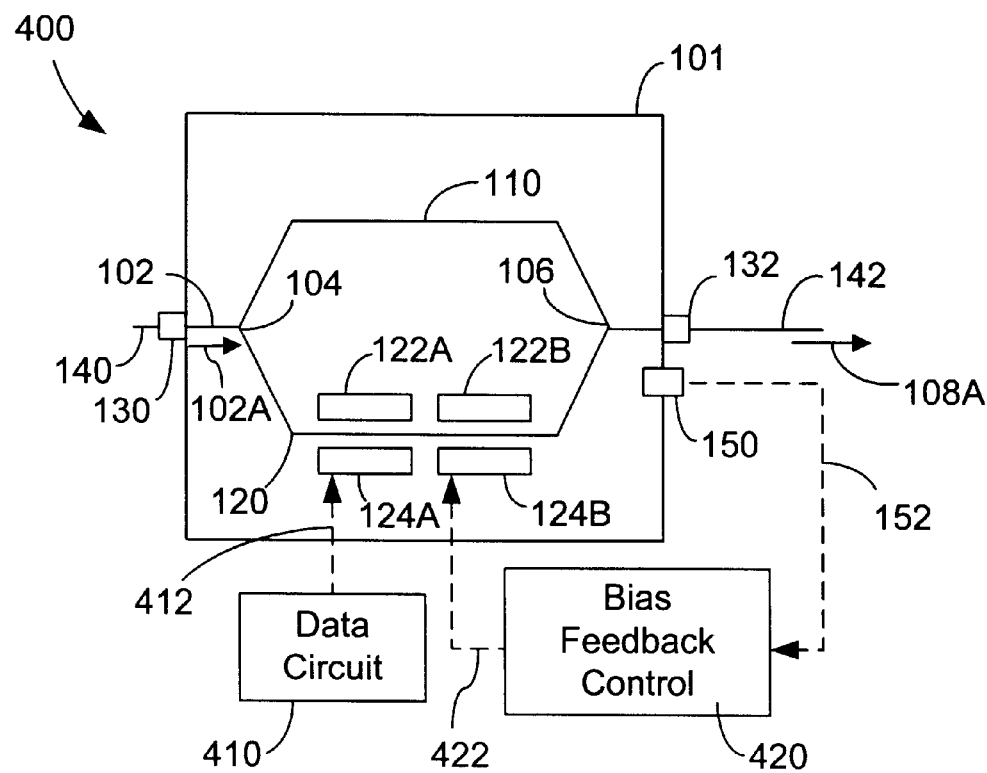
FIG. 4 shows a bias feedback control based on the output of the optical sampling detector in FIG. 1.

Hence, by controlling the voltage on the electrodes 122 and 124 to change the optical path difference between $(K+1/2)\lambda$ and $K\lambda$, the device 100 can turn off and on the guided output signal 108A to operate as an optical switch or an optical modulator. In general, the electro-optic material may be electrically biased at a selected DC voltage. An AC control voltage is then applied over the DC bias voltage to control or modulate the guided output signal 108A. Referring to FIG. 4, the pair of electrodes 122 and 124 may include two separate subsets of electrodes with one subset (122B and 124B) electrically coupled to provide the DC bias and the other subset (122A and 124A) electrically coupled to provide the AC control voltage.

It is recognized that, in addition to the above guided output optical signal 108A in the guided mode, a portion of the optical energy produced by the optical interference at the coupler 106 also dissipates outside the output waveguide 108 in an unguided mode into the surrounding areas of the coupler 106, including the substrate 101. Under the conservation of energy at the coupler 106, the total sum of this unguided portion and the guided portion 108 is equal to the total sum of the received signals 110A and 120A by the coupler 106. Hence, when the interference is constructive, the output signal 108A reaches its maximum while the unguided portion is at its minimum. Conversely, when the interference is destructive, the output signal 108A reaches its minimum while the unguided portion is at its maximum. Therefore, the strength of this unguided portion of the optical energy is complementary to the strength of the guided output signal 108A and hence any signal variation in the guided signal 108A, such as a change in amplitude, can be faithfully represented by a complementary variation in the unguided portion.

In particular, this unguided portion of optical energy can be collected and measured without optically affecting the guided signal 108A. This is because this unguided portion of optical energy is not guided by the output waveguide 108 and hence there is no need to optically tap the output signal 108A either at the output waveguide 108 or somewhere in the downstream of the output waveguide 108 in order to monitor the guided signal 108A. The unguided portion can be collected at a location where the unguided portion of energy is present.

For example, as illustrated in FIG. 1, an optical detector 150 may be positioned above the output waveguide 108 over the substrate 101 to receive the unguided portion and to produce an optical monitoring signal 152 that is complementary to the output signal 108A. Notably, the optical detector 150 need not be optically coupled to receive the guided output signal 108A so that the presence and operation of the detector 150 do not interfere with any aspect of transmission and subsequent processing of the output signal 108A. A lens, a lens combination, or other suitable optical collecting element, may be positioned between the substrate 101 and the detector 150 to increase the effective collecting aperture of the detector 150.

It is further recognized that, the unguided portion of the optical energy in the substrate 101 emanates outside the substrate at the boundary of the substrate 101 near the output waveguide 108. Hence, the detector 150 may be positioned above the output end of the output waveguide 108 at the edge of the substrate 101 to collect the unguided portion.

Figure 2:
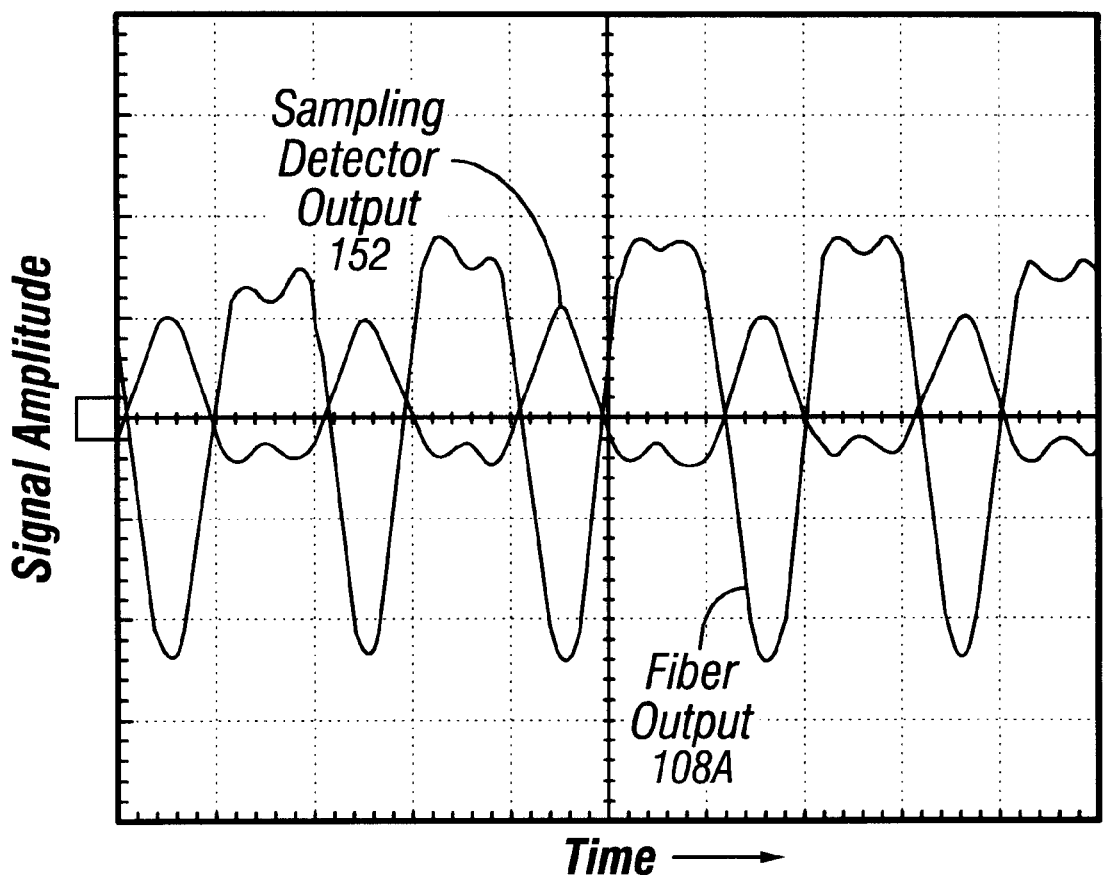
FIG. 2 shows measured output signals from the optical sampling detector and the output port of the device in FIG. 1.

In applications where optical fibers are used, the output waveguide 108 may be coupled to send the output signal 108A to an output fiber 142. A waveguide-to-fiber coupler 132 may be used to facilitate the coupling. For example, the coupler 132 may be a pigtail fiber coupler. A fiber-to-waveguide coupler 130 may also be used to couple an input fiber 140 to the input waveguide 102. In this configuration, the detector 150 may be preferably placed above the coupler 132 where the signal strength of the unguided portion is generally higher than other locations along the output waveguide 108. FIG. 2 shows measured output optical signal 108A and the output 152 of the detector 150.

Figure 3:
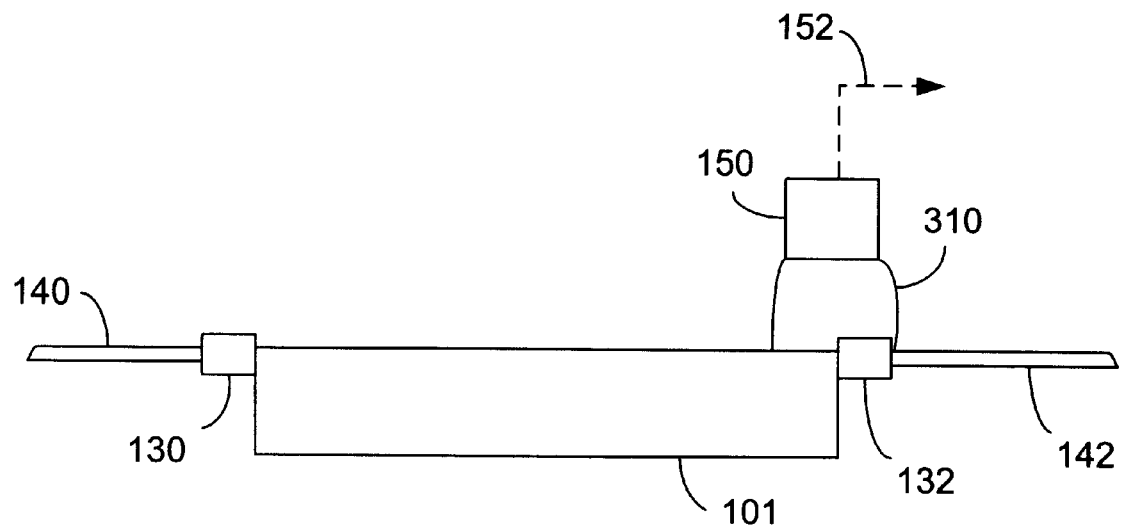
FIG. 3 shows a use of an index-matched dielectric material to fill the gap between the optical sampling detector and the output coupling mechanism in the device of FIG. 1.

FIG. 3 shows that, a transparent dielectric block 310 may be formed in the air gap between the detector 150 and the coupler 132 to enhance the collection efficiency of the detector 150. The refractive index of the block 310 may approximately match that of the fiber 142. In this configuration, the unguided portion in the substrate 101 propagates along the output waveguide 108 and is emanated outside the substrate 101 at the coupler 132 where the substrate 101 discontinues. A sufficient portion of the emanated energy is collected into the block 310 to the detector 150.

Alternatively, the optical detector 150 may be formed in the substrate 101 near the output waveguide 108 to collect the unguided portion dissipating into the substrate 101.

The output signal 152 of the detector 150 may be used to monitor the performance of the optical modulator 100. As one example as shown in FIG. 4, the modulator may be used to superimpose digital data on the input signal 102A as an optical carrier by applying modulated voltages representing the data across the electrodes 122A and 124A. The electrodes 122B and 124B are biased at a desired DC voltage. A data circuit 410 is used to provide an AC modulation voltage 412 that represents the data. The output signal 152 of the detector 150 may be used to monitor the bit error rate of the output signal 108A.

As another example, the output signal 152 of the detector 150 may also be used to determine whether the DC bias voltage across the bias electrodes 122B and 124B is at or near a DC value so that the DC value of the optical path length difference between the waveguides 110 and 120 at the coupler 106 is biased at a desired value. The DC bias point may be selected to operate the device within a particular linear range, at a minimal zero throughput, or at a half power point of the optical output. In some instances, the bias voltage may be applied to the some or all of the electrodes that apply the AC fields.

However, the DC bias value of the optical path length difference between the waveguides 110 and 120 at the coupler 106 may drift from the desired bias value due to a number of factors. For example, the temperature may vary and hence the physical length and the refractive index of each waveguide may change with the temperature. U.S. Pat. No. 6,181,456 B1 to McBrien et al. describes other common factors that contribute the bias drift. For example, although a constant DC bias voltage is applied, the actual electric field applied to the electro-optic portion of the waveguide may vary to cause the bias point of the device to drift. Physical impurities, crystal defects, and any causes of both trapped and mobile charges are considered to affect the bias stability of the device. In addition, because the optical waveguides are typically located near the surface of the electro-optic substrate, the crystal composition near the surface affects drift of the bias point via a variety of surface chemistry mechanisms. Even the method used for fabricating the waveguides, often involving indiffusion or proton exchange processes, can affect bias point drift, because these techniques modify the crystal structure. Such bias drift can adversely affect the performance of the device and hence it is desirable to reduce the drift.

FIG. 4 shows an exemplary electro-optic modulator 400 that uses one active bias feedback control mechanism for reducing the bias drift. The optical detector 150 as described above is used to receive the unguided optical energy emanated from the coupler 132 and to produce the detector output 152 that is complementary to the guided signal 108A in the output waveguide 108. A bias feedback control unit 420 measures the DC level of the signal 152 which is correlated to the DC level of the guided output signal 108A. Based on this measurement, the control unit 420 determines the bias drift and produces a control signal 422 that adjusts the DC voltage on the electrodes 122B and 124B to reduce the bias drift.

Although the present disclosure only describes a few embodiments, it is understood that various modifications and enhancements may be made without departing from the following claims.

What is claimed is:

1. A device, comprising:
    a substrate fabricated to include an input waveguide, an output waveguide, and first and second waveguides respectively having receiving ends coupled to a port of said input waveguide and output ends coupled to a port of said output waveguide, each waveguide operable to guide and transport optical signals;
    an optical output coupling mechanism having one end coupled to said output waveguide and another end coupled to an output optical fiber which receives a guided output optical signal from said output waveguide; and
    an optical detector, displaced from said substrate and positioned near said optical output coupling mechanism, to receive an optical signal that is not guided by either said output waveguide or said output optical fiber, and is complementary to said guided output signal.

2. The device as in claim 1, wherein said optical coupling mechanism is a pigtail junction between said output waveguide and said output optical fiber.

3. The device as in claim 1, wherein said optical detector is located above said substrate and near said optical coupling mechanism.

4. The device as in claim 3, further comprising a transparent dielectric material filled in a gap between said optical detector and said optical coupling mechanism.

5. The device as in claim 4, wherein said dielectric material has a refractive index that is substantially equal to a refractive index of said output optical fiber.

6. The device as in claim 1, wherein said optical detector is located on said substrate and near said optical coupling mechanism.

7. The device as in claim 1, wherein at least said first waveguide includes an electro-optic portion that is operable to change a refractive index in response to a control voltage applied thereto, said device further comprising a bias feedback control unit coupled to receive a detector signal from said optical detector and operable to control a DC bias in said control voltage in response to said detector signal to maintain a DC bias in a difference between optical path lengths of said first and said second waveguides at a desired DC bias value.

8. A device, comprising:
    an input port operable to receive an input-optical signal at a wavelength $\lambda$;
    an output port operable to output an output optical signal at the wavelength $\lambda$;
    first and second optical paths respectively coupled between said input and said output ports, wherein at least one of said optical paths includes a modulation portion in which an optical path length changes in response to a control signal so as to change a difference in optical path lengths between said first and said second optical paths at said output port, wherein said output signal has a maximum amplitude when said difference is $K\lambda$ at said output port and has a minimum amplitude when said difference is $(K+1/2)\lambda$ at said output port, where $K=0, \pm 1, \pm 2, \ldots$; and
    an optical detector, positioned near said output port to receive an optical monitoring signal that is complementary to said output signal.

9. The device as in claim 8, further comprising a substrate on which said input and said output ports, and said first and said second optical paths are fabricated.

10. The device as in claim 9, wherein said optical detector is positioned over said output port above said substrate.

11. The device as in claim 9, wherein said optical detector is fabricated on said substrate and positioned near said output port.

12. The device as in claim 8, wherein said modulation portion includes an electro-optic material whose refractive index changes with a control electrical field.

13. The device as in claim 8, further comprising:
    an optical coupler having one end coupled to receive said optical output signal from said output port and another end to output said output signal; and
    an optical fiber having a receiving end coupled to said another end of said optical coupler.

14. A method, comprising:
    splitting an input optical signal into two optical signals respectively guided in two different optical paths;
    controlling at least one of said optical paths to cause a relative delay between said two optical signals at a joint between said optical paths so that the two optical signals optically interfere with each other at said joint;
    obtaining an optical signal from said joint as an output signal which has a maximum amplitude when the interference at said joint is constructive and has a minimum amplitude when the interference at said joint is destructive; and
    obtaining another optical signal from said joint as a monitor signal which has a minimum amplitude when the interference at said joint is constructive and has a maximum amplitude when the interference at said joint is destructive.

15. The method as in claim 14, wherein said controlling is used to superimpose digital data in said output optical signal, and wherein said monitor signal is measured to monitor a bit error rate in said output optical signal.

16. The method as in claim 14, wherein said monitor signal is measured to monitor a DC bias in said relative delay produced by said controlling.

17. The method as in claim 16, wherein said monitor signal is used to produce a feedback control signal to adjust said DC bias.

18. The method as in claim 16, wherein at least said one optical path includes an electro-optic material, and wherein said monitor signal is measured to monitor a control voltage applied across said electro-optic material.

* * * * *